United States Patent
Aleonard et al.

(10) Patent No.: US 9,802,825 B2
(45) Date of Patent: Oct. 31, 2017

(54) PROCESS FOR MANUFACTURING SILICON CARBIDE

(75) Inventors: Bruno Aleonard, Paris (FR); Simonpietro Di Pierro, Paris (FR); Matthieu Schwartz, Courbevoie (FR)

(73) Assignee: SAINT GOBAIN CERAMIC MATERIALS AS, Lillesand (NO)

( * ) Notice: Subject to any disclaimer, the term of this patent is extended or adjusted under 35 U.S.C. 154(b) by 583 days.

(21) Appl. No.: 14/130,649

(22) PCT Filed: Jul. 3, 2012

(86) PCT No.: PCT/FR2012/051548
§ 371 (c)(1),
(2), (4) Date: Feb. 10, 2014

(87) PCT Pub. No.: WO2013/004967
PCT Pub. Date: Jan. 10, 2013

(65) Prior Publication Data
US 2014/0140915 A1  May 22, 2014

(30) Foreign Application Priority Data
Jul. 6, 2011 (FR) .................................... 11 56096

(51) Int. Cl.
*C01B 31/36* (2006.01)
(52) U.S. Cl.
CPC .......... *C01B 31/36* (2013.01); *C01P 2006/80* (2013.01)
(58) Field of Classification Search
None
See application file for complete search history.

(56) References Cited

U.S. PATENT DOCUMENTS

| 3,976,829 A | | 8/1976 | Wiebke et al. | |
| 4,419,336 A | * | 12/1983 | Kuriakose | C01B 31/36 423/345 |
| 4,702,900 A | * | 10/1987 | Kurachi | B82Y 30/00 423/345 |
| 4,839,150 A | | 6/1989 | Coyle et al. | |
| 5,021,230 A | * | 6/1991 | Krstic | C01B 31/36 423/345 |
| 2009/0220788 A1 | * | 9/2009 | Barrett | C01B 31/36 428/402 |

FOREIGN PATENT DOCUMENTS

DE      102008042499      4/2010

OTHER PUBLICATIONS

"Calcination of Petroleum Coke," Carbon Techniques, 1986.
International Search Report as issued for International Application No. PCT/FR2012/051548, dated Oct. 8, 2012.

* cited by examiner

*Primary Examiner* — Guinever S Gregorio
(74) *Attorney, Agent, or Firm* — Pillsbury Winthrop Shaw Pittman LLP

(57) ABSTRACT

A process for manufacturing SiC wherein the emissions of polluting gases are minimized, by reduction of silicon oxide by an excess of carbon, the process including electrically heating a resistor at the heart of a mixture of raw materials consisting of a carbon-based source chosen from petroleum cokes and a source of silicon, especially a silica having a purity of greater than 95% of $SiO_2$, in order to give rise, at a temperature above 1500° C., to the simplified reaction: $SiO_2+3C=SiC+2CO$ (1), wherein the carbon-based source first undergoes a treatment for removing the contained hydrogen, so that its elemental hydrogen content (EHWC) is less than 2% by weight.

12 Claims, No Drawings

PROCESS FOR MANUFACTURING SILICON CARBIDE

CROSS-REFERENCE TO RELATED APPLICATIONS

This application is the U.S. National Stage of PCT/FR2012/051548, filed Jul. 3, 2012, which in turn claims priority to French Application No. 1156096, filed Jul. 6, 2011. The content of both applications are incorporated herein by reference in their entirety.

The invention relates to a novel process for manufacturing silicon carbide.

Silicon carbide is a material that is extremely rare in the natural state due to the particular conditions needed for its synthesis (very high temperature, highly reducing atmosphere). However, this material has very many advantages, mainly due to its very high hardness and its refractory properties. It is especially used as an abrasive or else in the construction of furnaces, but also more recently as a wideband semiconductor. According to another more recent application, it is also used as a porous material for the manufacture of particulate filters. All these applications account for the fact that the demand for this material is very large and is increasing at the present time.

As is known, it is possible to synthesize silicon carbide by the high-temperature action of silicon on a carbon-based precursor or by reduction of a silicon precursor by a carbon-based precursor.

More specifically, according to this second mode, the silicon carbide is essentially produced from a carbon-based source and a source of silica.

The most common manufacturing process is the Acheson process, which consists in electrically heating a resistor at the heart of a mixture of the two raw materials in order to give rise to the simplified reaction:

$$SiO_2 + 3C = SiC + 2CO \qquad (1),$$

at a temperature above 1500° C., and even far above 2000° C. at the heart of the reaction zone.

As is known, a large amount of gas is emitted, generally to the open air, whether this is during the phase when the furnace is heated, during the silicon carbon synthesis phase or else during the cooling.

The source of silica is in general sand having a purity of greater than 95% of $SiO_2$ (preferably greater than 99% of $SiO_2$). The source of carbon is in general and preferably petroleum coke (residue of the distillation of oil). This petroleum coke is low in mineral ashes (less than 1% in general, measured according to ISO 1171). It also contains sulfur (from 0.2% to 5% in general according to ISO 19579) and volatile species (frequency around 10%, according to ISO 562).

In the present description, unless otherwise indicated, all the percentages are given by weight, on the basis of dry matter.

In such petroleum cokes, the elemental hydrogen weight content, also referred to as EHWC in the description, is typically of the order of 4%. The value of EHWC according to the invention is measured according to the ISO TS 12902 standard.

The use of such a coke during the manufacture of SiC may lead to an undesirable impact in terms of health, safety or environment (HSE), by producing harmful gaseous species such as $H_2$, $CH_4$, $H_2S$, $SO_2$, mercaptans, amino compounds and aromatic organics.

Condensable species of the tar or PAH (polycyclic aromatic hydrocarbon) type, which are also undesirable from the HSE point of view, may also be released in large amounts, depending on the source of carbon. It should be noted that pure sources of carbon (>99% of C) are much more expensive and are incompatible with mass production.

In order to solve the problem of the release of gases during the Acheson process, patent U.S. Pat. No. 3,976,829 describes a process for manufacturing SiC comprising gas collection means. More specifically, it is proposed in this publication to affix additional coverage means on top of the reaction mixture positioned around the electrical resistor of the Acheson furnace that are coupled to means for collecting the gaseous products emitted during the synthesis of SiC. The gases collected are then treated and/or burnt, so as to prevent the emission of harmful reduced gases. Nevertheless, this technique requires delicate handling and fine process control. In particular, the gases from the process being toxic and/or explosive, typically with a gas mixture comprising of the order of 50 vol % of CO and 30 vol % of $H_2$. Such a mixture entails and requires very fine and difficult control of the gases present under the cover. Such a control is made even more difficult since the Acheson process is, as is known, subject to some gaseous eruptions due to local overpressures. During such phenomena, the cover placed on top of the furnace may rapidly lose its usefulness and worse, in the extreme, generate large explosions due to the storage of a potentially uncontrolled volume of explosive gas above the furnace. In addition, the large emissions of condensable species (PAHs) during the Acheson process lead to the rapid clogging up of the pipes and other means used for the collection and discharge of the gases, which makes the management of such an installation costly and complex.

The objective of the present invention is, according to a first aspect, to propose an alternative process for manufacturing SiC from a coke laden with hydrogen-containing compounds (that is to say compounds with a weight percentage of contained hydrogen of at least 2%, or even at least 3% at the start), very particularly a petroleum coke, coal coke or coke resulting from biomass, which makes it possible to limit the releases of harmful species during furnace temperature rise, SiC synthesis and furnace cooling phases.

Without departing from the scope of the invention, other sources of carbon such as cokes resulting from biomass or from coal may also be used.

More specifically by application of the present process, it is possible to obtain many advantages during the procedure for producing SiC:

drop in the emissions of gases (except CO, which is intrinsic to the reaction (1)) and condensable species (PAHs) and in their undesirable effects (toxicity risks, odors, overpressures), especially in the case of emissions to the open air, in particular, drop in the emissions of sulfur-containing gases for the weakly bonded fraction of sulfur, and drop in the emissions of amino compounds, removal of fine particles (subject to fly-offs) by the agglomeration of carbon-based particles.

According to another aspect, the process that is the subject of the present invention additionally enables, under its specific implementation conditions, a drop in the energy consumption of the overall reaction for formation of SiC, in particular of the electrical energy consumption of the furnace, compared to a Acheson type process carried out under customary conditions.

More specifically, the present invention relates to a process for manufacturing SiC, wherein the emissions of polluting gases are minimized, comprising the reduction of silica by carbon, said process consisting in electrically heating a resistor at the heart of a mixture of raw materials consisting of a) a carbon-based source selected from cokes, especially petroleum coke, b) and a source of silicon, especially a silica having a purity of greater than 95% of $SiO_2$, in order to give rise, at a temperature above 1500° C., to the simplified reaction:

$$SiO_2 + 3C = SiC + 2CO \qquad (1).$$

Said process is characterized in that said carbon-based source first undergoes a treatment for removing the contained hydrogen, so that its elemental hydrogen content (EHWC) is less than 2% by weight.

The process according to the invention especially comprises the following steps:

mixing of raw materials consisting of a carbon-based source selected from cokes, the elemental hydrogen content (EHWC) of which is greater than 2%, or even greater than 3%, by weight and a silica having a purity of greater than 95% of $SiO_2$, said carbon-based source undergoing, before the mixing thereof with the silica, a treatment for removing the contained hydrogen, so that its elemental hydrogen content (EHWC) is less than 2% by weight, electric heating of said mixture of raw materials by a resistor positioned at the heart thereof, up to a temperature of greater than 1500° C., in order to give rise to the reduction of the silicon oxide by the carbon, at a temperature above 1500° C., according to the simplified reaction:

$$SiO_2 + 3C = SiC + 2CO \qquad (1).$$

The expression "minimization of the emissions of pollutants" is especially understood, within the meaning of the present invention, to mean:

a volume content of $H_2$ of the gas emitted by the furnace (on average during the SiC formation phase, before any dilution, especially atmospheric dilution and before any subsequent treatment) of less than 10 vol %, preferably of less than 5% or even less than 1%, a volume content of $CH_4$ of the gas emitted by the furnace (on average during the SiC formation phase, before any dilution, especially atmospheric dilution and before any subsequent treatment) of less than 1 vol %, preferably of less than 0.5% or even less than 0.1%, a volume content of $H_2S$ of the gas emitted by the furnace (on average during the SiC formation phase, before any dilution, especially atmospheric dilution and before any subsequent treatment) of less than 1000 ppm vol, preferably of less than 500 ppm vol, a volume content of $SO_2$ of the gas emitted by the furnace (on average during the SiC formation phase, before any dilution, especially atmospheric dilution and before any subsequent treatment) of less than 500 ppm vol, preferably of less than 200 ppm vol, a volume content of COS of the gas emitted by the furnace (on average during the SiC formation phase, before any dilution, especially atmospheric dilution and before any subsequent treatment) of less than 1000 ppm vol, preferably of less than 500 ppm vol, or even 100 ppm vol, a PAH content of less than 500 ng per $m^3$ of gas emitted by the furnace, or less than 100 ng per $m^3$ of even less than 50 ng per $m^3$.

Preferably, the coke, after dehydrogenation, has a content of less than 10 ng/mg, or even less than 1 ng/mg or else less than 0.5 ng/mg for each of the following PAH compounds: naphthalene, acenaphthene, fluorene, phenanthracene, chrysene, anthracene, pyrene, benz[a]anthracene, benzo[a]pyrene, dibenzo[a,h]-anthracene, benzo[ghi]perylene, benzo[k]fluoranthene, fluoranthene, benzo[b]fluorathene and In[1,2,3-cd]P).

It has been found by the applicant company that the overall energy input needed for the manufacture of SiC, including a coke pretreatment step, could be substantially reduced compared to the conventional Acheson process in which the petroleum coke is directly brought into contact with the silica. In particular, the energy balances carried out show that the energy efficiency of the Acheson furnace in a process according to the invention is against all expectation substantially improved.

In particular, establishing. slightly oxidizing atmospheres in the pretreatment furnace, that is to say atmospheres for which the oxygen content is controlled, further reduces the overall energy input by the (exothermic) combustion of the volatiles in the furnace.

Very particularly, the overall power consumption needed for the manufacture of SiC may advantageously be substantially reduced if the coke pretreatment is carried out by combustion. Such an embodiment improves the balance of greenhouse gas emissions in the case of electricity having a fossil primary source.

Finally, the greenhouse gas emissions are also greatly reduced due to the conversion of strong greenhouse gases emitted in the conventional process (such as methane) into $CO_2$ during the pretreatment combustion.

Preferably, the residual elemental hydrogen content of the petroleum coke is less than 1% and very preferably less than 0.5%, or even less than 0.1%.

In particular, the best energy balances of the overall process for manufacturing SiC have been found when the EHWC of the treated coke was between 0.01% and 0.1%, especially between 0.01% and 0.05%. In particular, the additional energy expenditure needed to obtain an EHWC of less than 0.01 resulted in an overall energy balance that was then degraded, due to the energy expended during the preliminary petroleum coke dehydrogenation step, without however the releases of pollutants being substantially reduced thereby.

According to the invention, the treatment for removing hydrogen from the source of carbon is carried out before it is mixed with the source of silicon. Thus, the studies carried out by the applicant company have shown that, against all expectation, the energy balance is on the whole improved.

In one preferred mode of the invention, the hydrogen removal treatment is selected and its conditions fixed such that less than 5 wt %, preferably less than 1 wt % of the fixed carbon of the coke (on the dry product) is removed at the same time (NF M 03-006).

Very particularly and for this purpose, the treatment is preferably carried out in an atmosphere that is not very oxidizing. In particular:

According to a first possible mode, the hydrogen removal treatment may for example be a controlled heat treatment of the coke in an electric furnace, under an inert atmosphere, for example of argon or nitrogen.

According to another preferred mode, the hydrogen removal treatment is a heat treatment in a fired furnace, especially a rotary fired furnace, between 1000° C. and 1350° C., preferably between 1250° C. and 1350° C. During this treatment, the oxygen partial pressure of the calcination atmosphere is advantageously less than 5% of the total pressure of the gases; preferably less than 1% of the total pressure of the gases. According to one possible embodiment of this mode that makes it possible to minimize the energy used during the removal treatment, the gases resulting from the hydrogen removal step are at least partly used as fuel for said fired furnace, as already previously described.

According to another implementation aspect of the present invention, the dimensions of the resistor of the furnace for the synthesis of SiC, especially its cross section and/or its length, are advantageously configured as a function of the electrical resistivity of the dehydrogenated carbon-based source, in order to optimize the efficiency thereof.

According to one advantageous mode of the present invention, on top of the reaction mixture positioned around the electrical resistor of the Acheson furnace, additional coverage means are put in place, such as, for example, those described in patent U.S. Pat. No. 3,976,829, these coverage means being coupled to means for collecting (and discharging) the gaseous products emitted during the synthesis of SiC. In such a case, it then becomes easier to treat the polluting gases thus collected. Such a mode makes it possible, in particular, to solve the problems disclosed previously in connection with the system proposed in patent U.S. Pat. No. 3,976,829: the preliminary dehydrogenation step according to the invention results in an extremely significant reduction in hydrogenated compounds, organic compounds, sulfur-containing compounds or PAH-type condensable compounds in the gases resulting from the reaction, as is described in the examples which follow. Such a reduction makes it possible to efficiently reduce the risks linked to the hydrogen gas, and also the problems of clogging/corrosion of the recovery and collection device.

Finally, the retreatment of a gas that does not contain very much sulfur and consists almost exclusively of carbon monoxide is of course greatly facilitated compared to that resulting conventionally from an Acheson furnace, in which gases of very different nature and properties may be mixed, in very variable amounts (see in particular Table 1 which follows).

The invention and its advantages will be better understood on reading the detailed description which follows. Of course, the present invention is not limited to such a mode, under any of the aspects described subsequently.

A mixer of a carbon-based source of the type: petroleum coke/sand (of which the percentage of silica $SiO_2$ is greater than 95%) is produced under the standard conditions for a person skilled in the art. The examples which follow were carried out using a Brazilian petroleum coke from the company Petrobras resulting from the distillation of oil in which the EHWC is measured at 4%.

The petroleum coke is precalcined under temperature conditions and for a time that is sufficient to enable the reduction of its elemental hydrogen weight content (EHWC). The EHWC is measured within the meaning of the present invention according to the standard ISO TS 12902.

This step of reducing the hydrogen content may, for example, be obtained by a controlled heat treatment of the coke in an electric furnace, under an inert atmosphere.

In particular, according to the tests carried out in the laboratory under such conditions, the heat treatments may result, without substantial energy expenditure, in a reduction of the EHWC by a factor of greater than 100. By way of example, a final EHWC of around 0.03% was measured following a heat treatment comprising a hold at a maximum temperature of 1350° C. of less than 30 minutes and of around 0.06% following a heat treatment at 1200° C. for two hours of the petroleum coke provided by the company Petrobras.

According to another possible mode, the tests carried out by the applicant showed that EHWCs of less than 0.1%, or even of less than 0.05% may also be obtained for samples treated in a fired furnace between 1250° C. and 1350° C., small losses of fixed carbon being observed at the same time (from 1% to 5% on the dry product depending on the operating conditions). In order to do this the oxygen partial pressure in the calcination atmosphere must be as low as possible, typically less than 5% of the total pressure of the gases and preferably less than 1%, or even less than 0.7% of the total pressure of the gases.

Very particularly, it is preferred according to the invention to use a fired rotary furnace in order to carry out the industrial calcination of the coke, under the conditions cited previously.

The aforementioned calcination cycles include residence times of the coke at the maximum temperature hold generally of less than one hour, in particular of the order of 20 minutes to one hour.

The thus dehydrogenated coke, optionally stripped of the largest particles (>1 cm in diameter) beforehand (by passing through a hammer mill for example), is then mixed with the source of silicon as described previously.

The whole assembly is introduced into the SiC reactor, for example an Acheson type furnace incorporating an electrical resistor that is 1.6 meters long but is modified in order to adapt it to the mixture according to the present invention. In particular, the resistivity of the system is consequently modified, by adjusting the dimensions of the central resistor (that is to say reduction of the cross section and of the length).

In particular, the applicant company observed that the step of removing hydrogen by the supplementary step described previously, with respect to an Acheson process carried out conventionally, leads to a significant drop in the resistivity of the carbon-based source, in particular of the coke.

In particular, since the resistivity of the calcined coke is very substantially decreased relative to that measured from the crude coke, the tests carried out within the context of the present invention have shown that the equivalent resistance of the complete furnace could be lowered by a factor which may range up to two under the conditions of the tests carried out. The geometry of the central resistor heating the reaction mixture (in general graphite) can therefore be adapted in order to adapt it to the specificities of the electric transformer of the Acheson furnace by playing, for example, with its cross section and/or optionally its length.

The calcined coke may take up atmospheric moisture depending on its conditions of transportation and storage between the calcination furnace and the Acheson furnace. This moisture does not introduce a significant change in the effects mentioned above nor in the contents (given for dried matter) mentioned.

The process is otherwise carried out conventionally.

The invention and its advantages will be better understood on reading the examples that follow.

EXAMPLES

Example 1 (Comparative):

Firstly, silicon carbide was initially manufactured in a pilot furnace, from a mixture of petroleum coke from the company Petrobras described previously and silica, under the conventional and well-known conditions of the Acheson process. The silica has a particle size distribution such that 50% by weight of the grains is less than 600 microns. The particle size of the petroleum coke is less than 10 mm. The mixture is placed in contact with an electrical resistor. The electric resistor is sized such that the power delivered is of the order of 300 kW. The mixture is brought to a temperature above 1500° C. in the reaction zone, in order to obtain the reaction (1) for manufacturing SiC. Throughout the SiC manufacturing process, that is to say over the time during which the electric current passes through the resistor, the gases resulting from the reaction are collected and analyzed in line, in order to determine the composition and content thereof in the various pollutants. The results obtained are assembled in Table 1 which follows.

Example 2 (According to the Invention):

The experimental protocol from example 1 is repeated in an identical manner but a prior step of treatment (calcination) of the petroleum coke is carried out in a fired rotary furnace, consisting of a step of heating at a temperature of 1350° C., followed by a drop to ambient temperature, the oxygen partial pressure in the calcination atmosphere being less than 1% of the total pressure of the gases, so that the EHWC is close to 0.03%. After milling the dehydrogenated coke, the mixture is placed in contact with a resistor, the cross section of which is reduced in order to compensate for the reduction in the electrical resistivity of the dehydrogenated coke (and therefore of the mixture), the power delivered by said resistor being maintained at around 300 kW, as for the preceding example.

In the same way as before, during the SiC manufacturing process, the gases resulting from the reaction are collected and analyzed in line, in order to determine the content thereof in the various pollutants. The results obtained are also assembled in Table 1 which follows.

TABLE 1

| | Example 1 | Example 2 |
|---|---|---|
| CO* (vol %) | 62 | 95 |
| $H_2$* (vol %) | 30 | 1 |
| $CH_4$* (vol %) | 4 | 0.3 |
| $H_2S$* (ppm vol.) | 2000 | 1000 |
| $SO_2$* (ppm vol.) | 1000 | 500 |
| $NH_3$* (ppm vol.) | 5000 | <500 |
| PAH** (ng/m³) | 2000 | <100 |

*average value over the whole of the SiC generation cycle, at the point of emission into the furnace (before dilution in air)
**average value over the whole of the SiC generation cycle, at a height of 1 meter above the furnace On reading Table 1, it is seen that the amount of pollutants emitted is substantially reduced when the process according to the invention (example 2) is used. A marked reduction in organic and sulfur-containing odors is thus observed compared to the reference situation of the Acheson furnace, in which the coke is used without prior dehydrogenation.

Such a phenomenon is even more surprising since the sulfur content of the coke after dehydrogenation was measured as being close or even identical to that of the crude coke (before dehydrogenation).

Such a composition of gases emitted by the Acheson furnace, consisting essentially of CO and in which the content of pollutants, especially sulfur-containing or PAH-type condensable pollutants is substantially reduced, may be easily collected without danger of explosion or of clogging of the recovery circuit, especially in order to be treated, especially by burning.

Moreover, the results of measuring, by screening, the particle size of the hydrogenated and non-hydrogenated cokes, listed in table 2 below, indicate that the coke fines are largely removed by the supplementary calcination treatment according to the invention, either by combustion or by entrainment in the calcination furnace (which is not desirable and is in the minority in our test) or else by agglomeration. Such a particle size distribution characteristic results in a substantially reduced dust accumulation in the vicinity of the Acheson furnace, especially during the assembly and disassembly thereof.

TABLE 2

| | Example 1 | Example 2 |
|---|---|---|
| $d_{10}$* | 100 μm | 250 μm |

*median grain diameter for which 10%, by weight, of the grains of the coke powder having an equal or smaller size.

Finally, as a function of the source of coke used and of its residual hydrogen value, after the step of removing the contained hydrogen according to the invention, it was measured by the applicant company that the measured energy efficiency of an Acheson type furnace modified in order to treat a dehydrogenated coke according to the invention may be between around 10% and around 25% higher than a conventional Acheson furnace, as used for the treatment of a non-dehydrogenated coke. The expression "energy efficiency" of the Acheson furnace is understood to mean the efficiency calculated on the basis of the kWh expended for the final formation of one kilo of SiC.

The invention claimed is:

1. A process for manufacturing SiC, wherein the emissions of polluting gases are minimized, comprising reducing silicon oxide by carbon according to an Acheson process, by electrically heating a resistor in a mixture of raw materials consisting of a carbon-based source selected from cokes and a silica having a purity of greater than 95% of $SiO_2$, in order to give rise, at a temperature above 1500° C., to the simplified reaction:

$$SiO_2 + 3C = SiC + 2CO \qquad (1),$$

wherein said carbon-based source first undergoes a treatment for removing the contained hydrogen, so that its elemental hydrogen content (EHWC) is between 0.5% and 0.01% by weight, wherein the hydrogen removal treatment is a controlled heat treatment of the coke in an electric furnace, under an inert atmosphere or is a heat treatment in a fired furnace between 1000° C. and 1350° C.

2. The process as claimed in claim 1, wherein the residual elemental hydrogen content of the coke is between 0.1% and 0.01%.

3. The process as claimed in claim 2, wherein the residual elemental hydrogen content of the coke is between 0.05% and 0.01%.

4. The process as claimed in claim 1, wherein the hydrogen removal treatment is carried out in an atmosphere so that less than 5% by weight of the fixed carbon on the dry product is removed during the hydrogen removal treatment.

5. The process as claimed in claim 4, wherein less than 1% by weight of the fixed carbon on the dry product is removed during the hydrogen removal treatment.

6. The process as claimed claim 1, wherein the hydrogen removal treatment is a heat treatment in a fired furnace between 1250° C. and 1350° C.

7. The process as claimed in claim 1, wherein the oxygen partial pressure of the calcination atmosphere is less than 5% of the total pressure of the gases.

8. The process as claimed in claim 7, wherein the oxygen partial pressure of the calcination atmosphere is less than 1% of the total pressure of the gases.

9. The process as claimed in claim 1, wherein the gases resulting from the hydrogen removal step are used at least partly as fuel for said fired furnace.

10. The process as claimed in claim 1, wherein, on top of the reaction mixture positioned around the electrical resistor of the Acheson furnace, additional coverage means are put in place, coupled to means for collecting the gaseous products emitted during the synthesis of the SiC.

11. The process as claimed in claim 10, wherein the gases collected are treated by burning off.

12. The process as claimed in claim 1, wherein the carbon-based source is a petroleum coke.

* * * * *